Dec. 6, 1927. Re. 16,811

J. WILCOX, JR

CLOCK CASING

Original Filed April 13, 1922

Inventor
JOSEPH WILCOX, JR.
By Attorneys
Southgate Fay & Hawley

Reissued Dec. 6, 1927. Re. 16,811

UNITED STATES PATENT OFFICE.

JOSEPH WILCOX, JR., OF ATHOL, MASSACHUSETTS, ASSIGNOR TO THE WILCOX NOVELTY COMPANY, OF ATHOL, MASSACHUSETTS, A CORPORATION OF MASSACHUSETTS.

CLOCK CASING.

Original No. 1,442,758, dated January 16, 1923, Serial No. 552,131, filed April 13, 1922. Application for reissue filed October 28, 1924. Serial No. 748,441.

This invention relates to a casing for small desk clocks or for other similar time pieces. Such casings are commonly formed of celluloid or the equivalent and my invention relates particularly to improvements in the construction of such clock casings, my object being to provide a casing formed of a reduced number of parts, each of simple construction and easily manufactured.

A further object of my invention is to provide a casing made up as a single inseparable unit and requiring no additional loose or separate parts to constitute a complete clock casing. In particular, I form the dial ring and the movement-supporting sleeve as unitary parts of the casing, with consequent reduced cost of manufacture and decreased liability to loss or displacement of parts in assembling the movement with the casing.

A preferred form of my invention is shown in the drawings, in which

Figure 1:
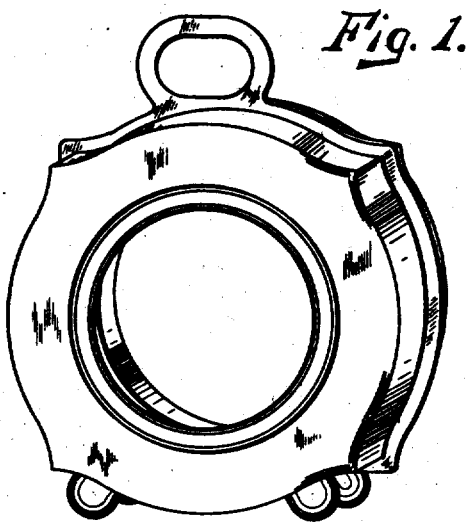
Fig. 1 is a perspective view of my improved clock casing.
Figure 4:
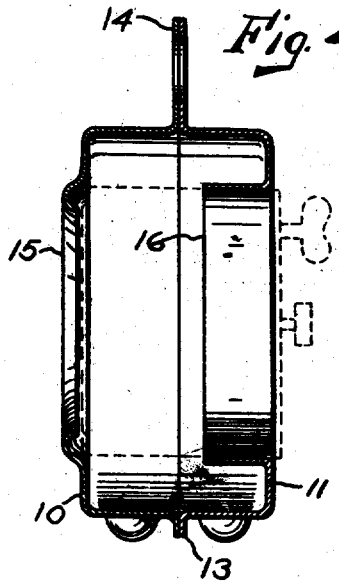
Fig. 4 is a sectional side elevation taken along the line 4—4 in Fig. 1 and indicating the position of a movement therein.
Figure 2:
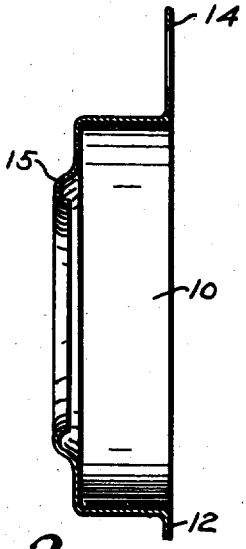
Figs. 2 and 3 are vertical sectional views of the front and back pieces of which the casing is formed.

Referring to the drawings, my improved clock casing comprises a front casing part 10 and a rear casing part 11. These parts 10 and 11 are provided with out-turned flanges 12 which are cemented or otherwise secured together to form a single encircling rib 13 as indicated in Fig. 4. The upper portion of the rib 13 may be extended and shaped to form a handle 14 when so desired.

The front portion 10 of the casing is provided with an integral dial ring or frame 15 adapted to fit closely against the glass of the clock movement as indicated in Fig. 4. The back portion 11 of the casing is also provided with an inwardly projecting integral cylindrical sleeve 16 fitting closely over the cylindrical barrel of the movement and firmly supporting the movement in position in the casing.

The movement may be so closely fitted within the sleeve 16 that it will be firmly retained in position therein or any suitable fastening devices may be additionally employed, if so desired. Lugs or feet on which the casing may rest are provided when desired but constitute no part of my invention.

Figure 3:
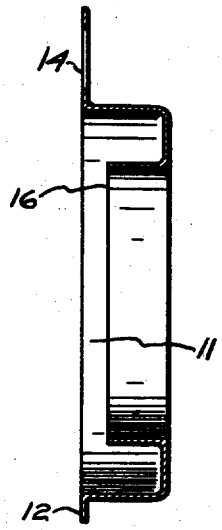
Figure 5:
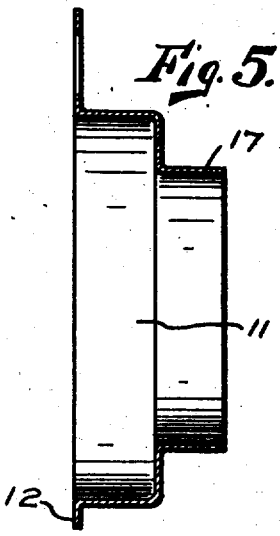
Fig. 5 is a detail sectional elevation showing a slight modification.

In Fig. 5 I have shown a slight modification in which a cylindrical sleeve 17 projects outward at the rear of the casing instead of inward as in Fig. 3. This modified construction is sometimes desirable to adapt a casing for use with a clock movement of unusual length.

From the foregoing description, it will be seen that my improved clock casing is formed from a minimum number of parts which are permanently secured together to form a single unitary structure, thus greatly simplifying both the manufacture of the casing and the assembly of a clock movement therewith.

Having thus described my invention and the advantages thereof, I do not wish to be limited to the details herein disclosed otherwise than as set forth in the claims, but what I claim is:—

1. A clock casing comprising a single inseparable unit having a casing side wall and a front face wall extending inwardly therefrom, said face wall having a dial opening, and a dial ring formed integral with said front face wall and displaced outwardly from the frame of said wall around said dial opening.

2. A clock casing comprising a front and a back portion, said portions being provided with flanges thereon permanently secured together.

3. A clock casing comprising a front and a back portion, said portions being provided with out-turned flanges thereon permanently secured together, the front portion of said casing having a dial ring integral therewith, and the back portion of said casing having a cylindrical sleeve to support a clock movement in said casing.

4. A clock casing comprising a front and a back portion, said portions being provided with out-turned flanges thereon permanently secured together, and said flanges being extended to form a handle for said casing.

5. A celluloid clock casing comprising a front and a back portion, said parts being provided with flanges thereon permanently secured together, the front portion of said casing having an integral dial ring, and the back portion having an inwardly extending cylindrical sleeve supporting a movement therein.

6. A clock casing for a cylindrical movement, said casing being formed of thin sheet celluloid and comprising a single inseparable unit having an integral cylindrical resilient movement-supporting sleeve forming a portion thereof, said sleeve extending forwardly from the back wall of said casing and being entirely supported thereby.

7. A clock casing for a cylindrical movement, said casing being formed of thin sheet celluloid and comprising a single inseparable unit having a dial ring and a cylindrical resilient movement-supporting sleeve both formed as integral parts of said casing.

In testimony whereof I have hereunto affixed my signature.

JOSEPH WILCOX, Jr.